United States Patent
Nanjundaswamy et al.

(10) Patent No.: US 8,169,920 B2
(45) Date of Patent: May 1, 2012

(54) MANAGEMENT INTERFACE AND TOOL FOR BENCHMARKING OPTICAL NETWORK TOPOLOGIES

(75) Inventors: Vijay Nanjundaswamy, Bangalore (IN); Joseline Rumitha Durairaj, Bangalore (IN)

(73) Assignee: Cisco Technology, Inc., San Jose, AZ (US)

( * ) Notice: Subject to any disclaimer, the term of this patent is extended or adjusted under 35 U.S.C. 154(b) by 847 days.

(21) Appl. No.: 11/697,488

(22) Filed: Apr. 6, 2007

(65) Prior Publication Data

US 2008/0198768 A1   Aug. 21, 2008

(30) Foreign Application Priority Data

Feb. 20, 2007 (IN) .............................. 343/DEL/2007

(51) Int. Cl.
- G06F 11/00 (2006.01)
- H04L 1/00 (2006.01)
- H04L 12/26 (2006.01)

(52) U.S. Cl. ...................... 370/242; 370/247; 370/248

(58) Field of Classification Search .................. 370/252, 370/410, 241–242, 244–245, 248–250, 251; 370/522–523, 247, 907, 255, 236–236.2; 714/712, 749–751; 709/237; 398/33, 58, 398/166

See application file for complete search history.

(56) References Cited

U.S. PATENT DOCUMENTS

| | | | | |
|---|---|---|---|---|
| 6,704,287 B1 * | 3/2004 | Moharram | ..................... | 370/242 |
| 6,732,189 B1 * | 5/2004 | Novaes | ......................... | 709/249 |
| 6,735,200 B1 * | 5/2004 | Novaes | ......................... | 370/390 |
| 6,791,981 B1 * | 9/2004 | Novaes | ......................... | 370/390 |
| 6,973,028 B1 | 12/2005 | Huai et al. | | |
| 7,054,951 B1 * | 5/2006 | Kao et al. | ....................... | 709/242 |
| 7,499,407 B2 * | 3/2009 | Holness et al. | ............... | 370/242 |
| 7,500,016 B2 * | 3/2009 | Kao et al. | ....................... | 709/242 |
| 7,567,523 B2 * | 7/2009 | Black et al. | .................. | 370/255 |
| 7,792,044 B2 * | 9/2010 | Holness et al. | ............... | 370/242 |
| 2004/0114924 A1 * | 6/2004 | Holness et al. | ................. | 398/33 |
| 2007/0094410 A1 * | 4/2007 | Voigt et al. | .................... | 709/237 |
| 2009/0202239 A1 * | 8/2009 | Holness et al. | ................. | 398/33 |

OTHER PUBLICATIONS

*Analyzer ensure device interoperability and IEEE 802.17 compliance for RPR-enabled equipment*, Anaheim, California, OFC/NFOEC, Booth No. 2901, Mar. 11, 2005.

Product Brochure, Agilent Technologies, *The industry's leading RPR solution with higher layer services inspection capability*, Agilent Technologies, Inc. 2005.

Product Brief, Nortel Networks, OPTera Connect DX optical switch, Delivering unprecedented efficiencies and end-to-end service solutions, Nortel Networks, 2003.

The Future of Sonet/SDH, *Heavy Reading*, vol. 1, No. 6, Nov. 14, 2003.

Product Note, *Packet Over Sonet/SDH (POS) functional testing*, Testing the hardware components that enable efficient ransport of data over SONET/SDH transmission networks, Agient Technologies, Copyright 2000.

\* cited by examiner

*Primary Examiner* — Chuong T Ho (74) *Attorney, Agent, or Firm* — Baker Botts L.L.P.

(57) ABSTRACT

A management tool facilitating benchmarking of optical network topologies. In one embodiment, a method includes receiving an identification of an optical network element, including network address information of the optical network element; receiving an identification of one or more optical network traffic generators, including access information of the optical network generators; and automatically accessing the identified optical network element, and one or more traffic generators in connection with execution of one or more tests on the optical network element.

22 Claims, 10 Drawing Sheets

```
+++++++++++++++++++
+ THIS IS THE RESULT FILE +
+++++++++++++++++++

+++++++++++++++++++++++++++++++++++
+ TESTS PLANNED          +
+++++++++++++++++++++++++++++++++++
   -> LINEAR APS TESTS

+++++++++++++++++++++++++++++++++++
No of Iterations : 1

+++++++++++++++++++++++++++++++++++
+ TARGET NE              +
+++++++++++++++++++++++++++++++++++
  -> 10.77.29.172 (08.00-005L-26.11)
  -> 10.77.29.173 (08.00-006L-26.11)

+++++++++++++++++++++++++++++++++++
+ TRAFFIC GENERATOR DETAILS +
+++++++++++++++++++++++++++++++++++
   -> TG-1 : GBNT718 on 10.77.29.177:2036

+++++++++++++++++++++++++++++++++++
+ RESULTS               +
+++++++++++++++++++++++++++++++++++
```

| ID | NE | TESTS | ACTION | TL1 RESULT | TG-1 | TG-1 HITS |
|---|---|---|---|---|---|---|
| 1.1 | 10.77.29.172 | OC12-2-2-1 1+1 | LOCKOUT OC12-2-2-1 | COMPLD | PASS | 0.000 |
| 1.2 | 10.77.29.172 | OC12-2-2-1 1+1 | CLEAR LOCKOUT | COMPLD | PASS | 0.000 |
| 1.3 | 10.77.29.172 | OC12-2-2-1 1+1 | MAN SW OC12-2-2-1 | COMPLD | PASS | 0.000 |
| 1.4 | 10.77.29.172 | OC12-2-2-1 1+1 | FRCD SW OC12-2-2-1 | COMPLD | PASS | 0.000 |
| 1.5 | 10.77.29.172 | OC12-2-2-1 1+1 | LOCKOUT OC12-2-2-1 | COMPLD | PASS | 0.000 |
| 1.6 | 10.77.29.172 | OC12-2-2-1 1+1 | CLEAR LOCKOUT | COMPLD | PASS | 0.000 |
| 1.7 | 10.77.29.172 | OC12-2-2-1 1+1 | MAN SW OC12-2-2-1 | COMPLD | PASS | 0.000 |
| 1.8 | 10.77.29.172 | OC12-2-2-1 1+1 | FRCD SW OC12-2-2-1 | COMPLD | PASS | 0.000 |
| 1.9 | 10.77.29.172 | OC12-2-2-1 1+1 | LOCKOUT OC12-2-2-1 | COMPLD | PASS | 0.000 |

Refresh    OK

Fig._5J

MANAGEMENT INTERFACE AND TOOL FOR BENCHMARKING OPTICAL NETWORK TOPOLOGIES

TECHNICAL FIELD

This disclosure relates generally to optical networks and benchmarking tools.

BACKGROUND

Synchronous Optical NETworking (SONET), is a method for communicating digital information using lasers or light-emitting diodes (LEDs) over optical fiber. There are multiple, very closely related standards that describe synchronous optical networking; Synchronous Digital Hierarchy (SDH) standard developed by the International Telecommunication Union (ITU), documented in standard G.707 and its extension G.708; and SONET as defined by GR-253-CORE. Optical networks typically comprise an array of different network elements, such as SONET network elements (NEs). Example SONET NEs include path terminating elements or terminal multiplexer, regenerators, add/drop multiplexers, cross-connects, and digital loop carriers. These network elements can be deployed in a variety of system architectures, such as point-to-point architectures, point-to-multipoint architectures, hub network architectures, and ring architectures.

SONET equipment is often managed with the Transaction Language 1 (TL1) protocol. TL1 is a telecom language for managing and reconfiguring SONET network elements. TL1 (or whatever command language a SONET Network Element utilizes) can be carried by other management protocols, including Simple Network Management Protcol (SNMP), Common Object Request Broker Architecture (CORBA) and eXtensible Markup Language (XML). One possible application for TL1 is for a management system (or NE) to package its trap/notification data in TL1 format and forward it to a network management component. An network management component may also provide a TL1-based facility for sending commands to the lower layers.

Most SONET NEs have a limited number of management interfaces defined. These may include electrical interfaces operative to send SONET TL1 commands from a local management network physically housed in the Central Office where the SONET NE is located. The electrical interface can be used for local management of the NE and, possible, remote management of other SONET NEs. In addition, a craft interface provides access to a SONET NE through a dumb terminal or terminal emulation program running on a laptop. This interface can also be hooked-up to a console server, allowing for remote out-of-band management and logging. In addition, SONET/SDH NEs may include dedicated Data Communication Channels (DCCs) for management traffic. Typically, one connection can reach all network elements within a given architecture; that is, separate links are not required for each network element.

The main functions of SONET Network Management typically include network and network element provisioning, software upgrades and performance management. In order to allocate bandwidth throughout a SONET Network, each SONET NE is configured. Although this can be done locally, through a craft interface, it is normally done through a Network Management System (siting at a higher layer) that in turn operates through the SONET/SDH Network Management Network. SONET NE Software Upgrade is in modern NEs done mostly through the SONET/SDH Management/network. SONET NEs have a very large set of standards for Performance Management. The PM criteria allow for monitoring not only the health of individual NEs, but for the isolation and identification of most network defects or outages. Higher-layer Network monitoring and management software allows for the proper filtering and troubleshooting of network-wide PM so that defects and outages can be quickly identified.

Additionally, SONET/SDH networks typically provide protection from failure by using topologies that dedicate half of the total bandwidth for protection. One type of SONET protection is bi-directional line switched ring (BLSR). The BLSR may be two-fiber or four-fiber. BLSR provides rapid restoration times with control logic. In a BLSR, traffic can be added and dropped at any node along a given ring. At the drop site, new traffic can be added to the previously used time slot and transported further around the ring. This re-use of bandwidth in a BLSR increases the capacity for the entire ring and provides many advantages over a unidirectional path switched ring (UPSR). If a fiber is cut in the BLSR, multiplexers have the speed to send the services affected via and alternate acceptable path through the ring without interruption.

When a BLSR is provisioned, each node in the BLSR is configured with knowledge as to what other nodes are in the same ring. Traditionally, BLSR software receives a list of IP addresses that a local BLSR node discovered. In order to determine if there are any other BLSR nodes in the list, the local node sends a message (e.g., UDP socket message) to each node and queries it. Upon receiving the message, a BLSR node replies by sending a respond message back with a valid BLSR node ID. A non-BLSR node will also will also send a respond message back but with a non-ring-node-id. The software generates a BLSR ring map after it receives all of the replies.

When new software for a SONET/SDH network element is delivered to the customer, a customer's test engineers typically perform a series of acceptance tests to check if the software is acceptable-such as the operation of automatic protection switching mechanisms.

DESCRIPTION OF THE DRAWINGS

FIGS. 5A thru 5J depict various aspects of an example graphical user interface provided by a management tool according to one possible implementation of the invention.

DESCRIPTION OF EXAMPLE EMBODIMENTS

A. Overview

In particular implementations, methods and apparatuses provide a management tool that facilitates acceptance and/or load testing of optical networking (e.g., SONET/SDH) software. In one implementation, the management tool provides a graphical user interface (GUI) that facilitates the configuration of one or more test to be used in testing one or more elements of an optical network. In one implementation, the management tool senses the topology of the network to select one or more appropriate tests, runs the appropriate tests, and logs the results of the tests. In one implementation, the management tool may operate in connection with separate traffic generation and monitoring functionally to obtain various measurements taken during execution of the one or more tests. In one implementation, the management tool displays the results of the tests in tabular form. Using this tool, a user can run selected tests before accepting optical networking software, such as SONET/SDH software. The management tool can be shipped with new software, and can save time during acceptance testing. The same tool can also be used to regular robustness testing or repeated switching.

The management tool, according to particular implementations, can be configured to test compliance against various SONET/SDH standards, such as GR253, GR1400, GR1230, G707, G841, etc. In one implementation, it uses the TL1 interface supported by one or more optical network elements to interact with the network elements as required to execute different tests. Such a tool can be deployed as an aid for ad hoc testing during system verification phases, especially to test new builds and to test robustness. For example, the management tool can be used to test a new software build and, over an extended period, to test robustness of continuous BLSR, LINEAR and UPSR or Multiplex Section Shared Protection (MSSP)/Linear Multiplex Section Protection (LMSP)/Single Node Control Point (SNCP) switching. Implementations of the invention can run on any optical network topology comprising any number of nodes. It can test any number of traffic types monitored by network traffic generation and monitoring equipment, such as Agilent® Omnibers® test equipment. Also, the set of selected tests can be run any number of times.

B. Example System Architecture and Environment

B.1 Example Network Topology

Figure 1:
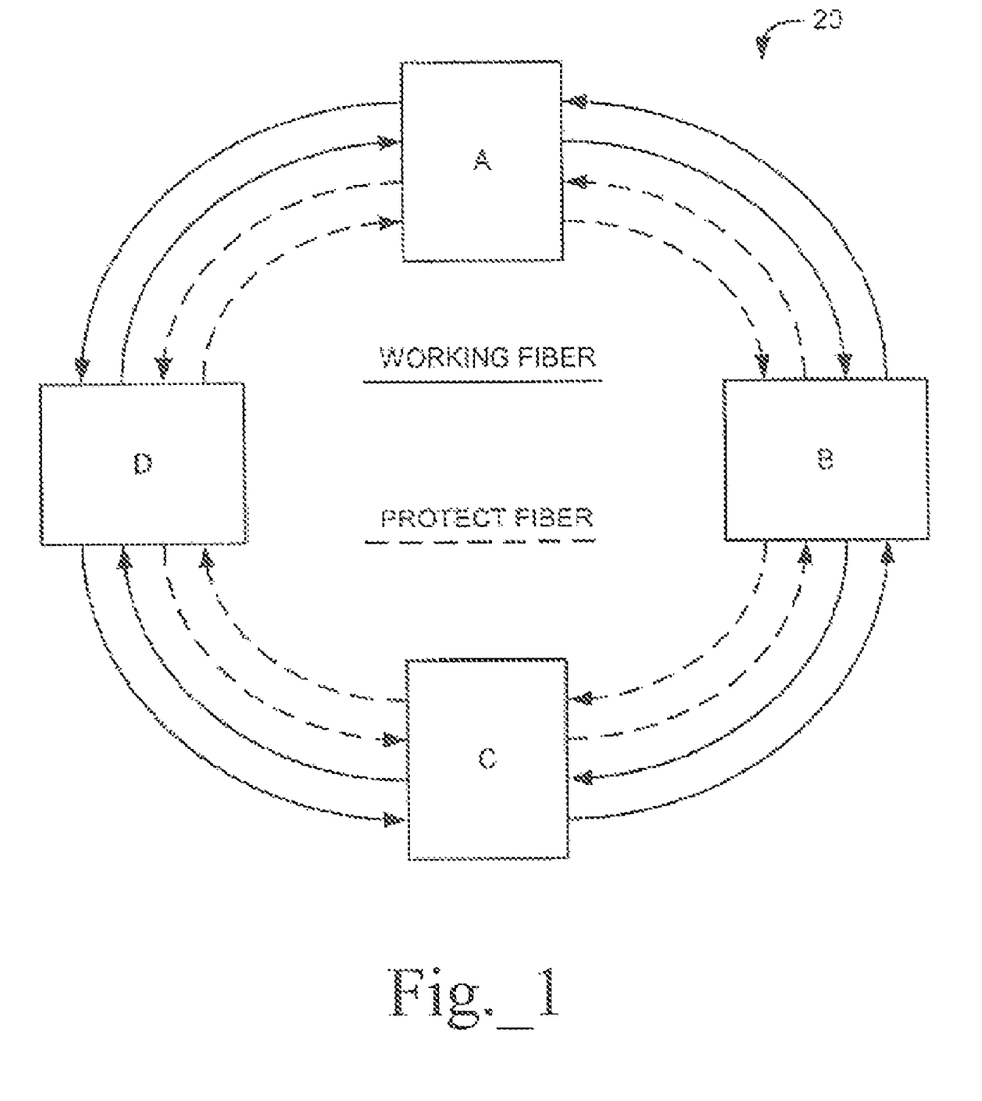
FIG. 1 is a schematic diagram illustrating an example topology for an optical network.

Referring now to the drawings, and first to FIG. 1, a four-fiber BLSR SONET ring is shown, and generally indicated at 20. The BLSR contains four nodes A, B, C, D. The BLSR may be used, for example, in the backbone of a long haul network. The four fiber bi-directional line switching ring sends traffic in the required direction during normal operation. The ring has a pair of working fibers (shown with solid lines) and a pair of protect fibers (shown with dashed lines). It is to be understood that the four-fiber BLSR is only provided as an example, and the present invention may be used with other configuration BLSRs such as a two-fiber BLSR and other network topologies and configurations, including Linear Automatic Protection Switching (APS), and Undirectional Path Switched Ring (UPSR). The BLSR consists of multiple SONET nodes that connect into a ring topology. When a BLSR is provisioned, each node in the BLSR discovers the nodes that are in the same ring. To provision a BLSR, each node is assigned with the same ring ID and unique node ID. Each node also has knowledge of the ring map (i.e., what other nodes are on the same ring and their node IDs and hop counts). The ring map may need to be updated when there is a change in the ring. Changes occur, for example, when a node is removed from the ring or when temporary failure of a BLSR link occurs.

Operably connected to the optical network are one or more traffic generators, which include network traffic generation, monitoring and measurement functionality. For example, one or more traffic generators may be connected to optical network elements and may each be operative to generate different types of network traffic (e.g, DS1, DS3, E1, E3, OCn, STMn, Ethernet and any other traffic type supported by a given network element). The management tool, in one implementation, may access these traffic generators to obtain measurements characterizing traffic disruption. Suitable traffic generators include the Omnibers® offered by Agilent Technologies, Inc. In one implementation, a traffic generator may send out traffic and monitor incoming traffic, allowing for monitoring of switch times.

In one implementation, the management tool is operative to access one or more traffic generators to initiate execution of one or more selected tests, and to receive and log the results of the selected tests.

B.2. Example Computing System Architecture

The management tool can be hosted on a variety of different systems, such as a desktop workstation, a laptop, or a server accessible to one or more client hosts. The management tool can be executed on a host having access to a single network element in the optical network. The data communication channels (DCCs) of the network element can be used to access other SONET/SDH network elements. This mode of operation reduces the number of inputs to the management tool. In other implementations, the management tool may be embodied on a computer readable medium including a series of computer-implemented processes. For example, the management tool can be shipped as software embodied in an optical disc (e.g., CD, DVD, etc) that is shipped along with the optical network element software. The software may include a series of instructions operative, when executed, to cause a computing system to perform one or more of the functions disclosed herein.

Figure 2:
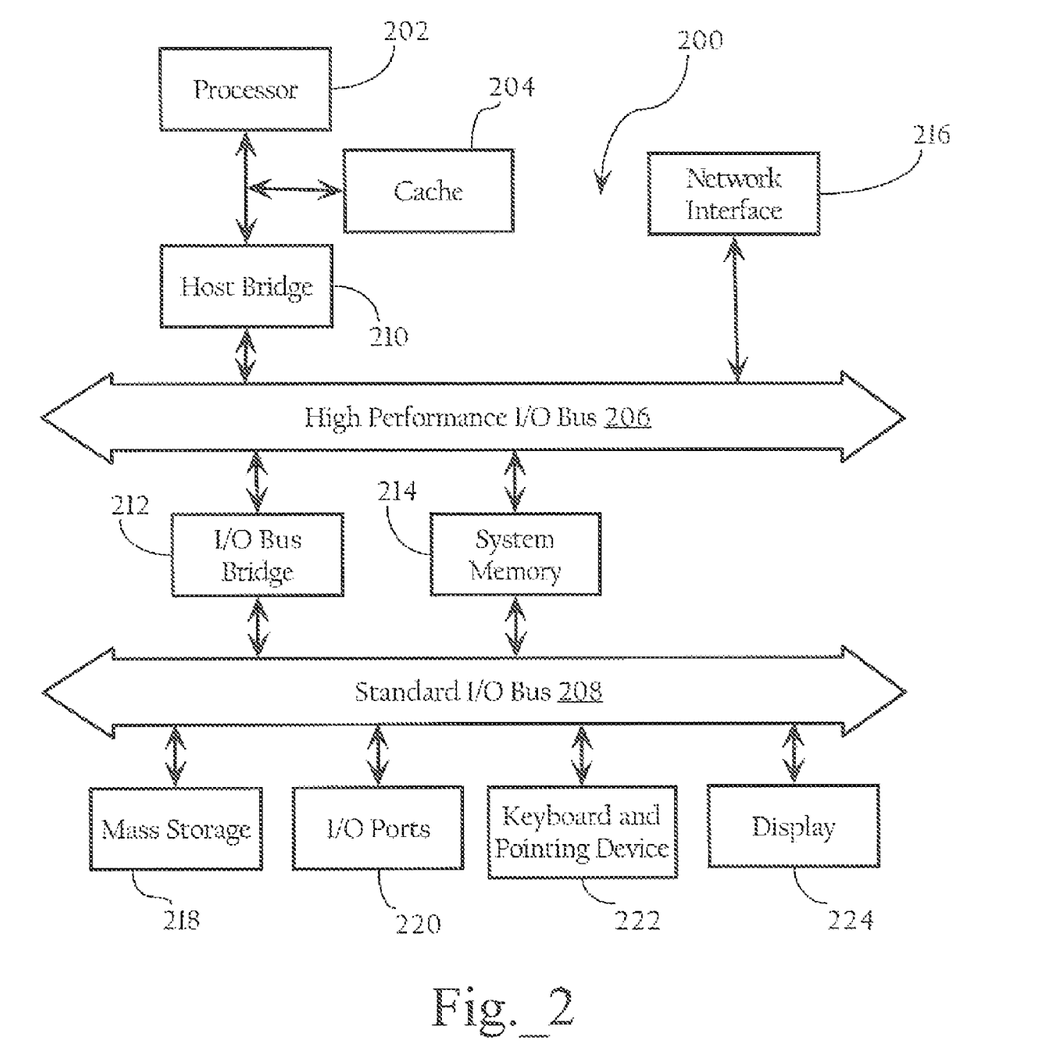
FIG. 2 provides a schematic diagram of an example computing system architecture on which implementations of the invention may be executed.

Some or all of the elements or operations of the management tool may be implemented using a computer system having a general-purpose hardware architecture. FIG. 2 illustrates an example computing system architecture, which may be used to implement one or more of the operations described herein. In one implementation, hardware system 200 comprises a processor 202, a cache memory 204, and one or more software applications and drivers directed to the functions described herein. Additionally, hardware system 200 includes a high performance input/output (I/P) bus 206 and a standard I/O) bus 208. A host bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, those elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the management tool described herein are implemented as a series of software routines run by hardware system 200. These software routines comprise a plurality or series of instructions to be executed by a processor in a hardware system, such as processor 202. Initially, the series of instructions can be stored on a storage device, such as mass storage 218. However, the series of instructions can be stored on any suitable storage medium, such as diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertine, Calif., UNIX operating systems, LINUX operating systems, and the like.

C. Example Management Tool and Operation

Figure 3:
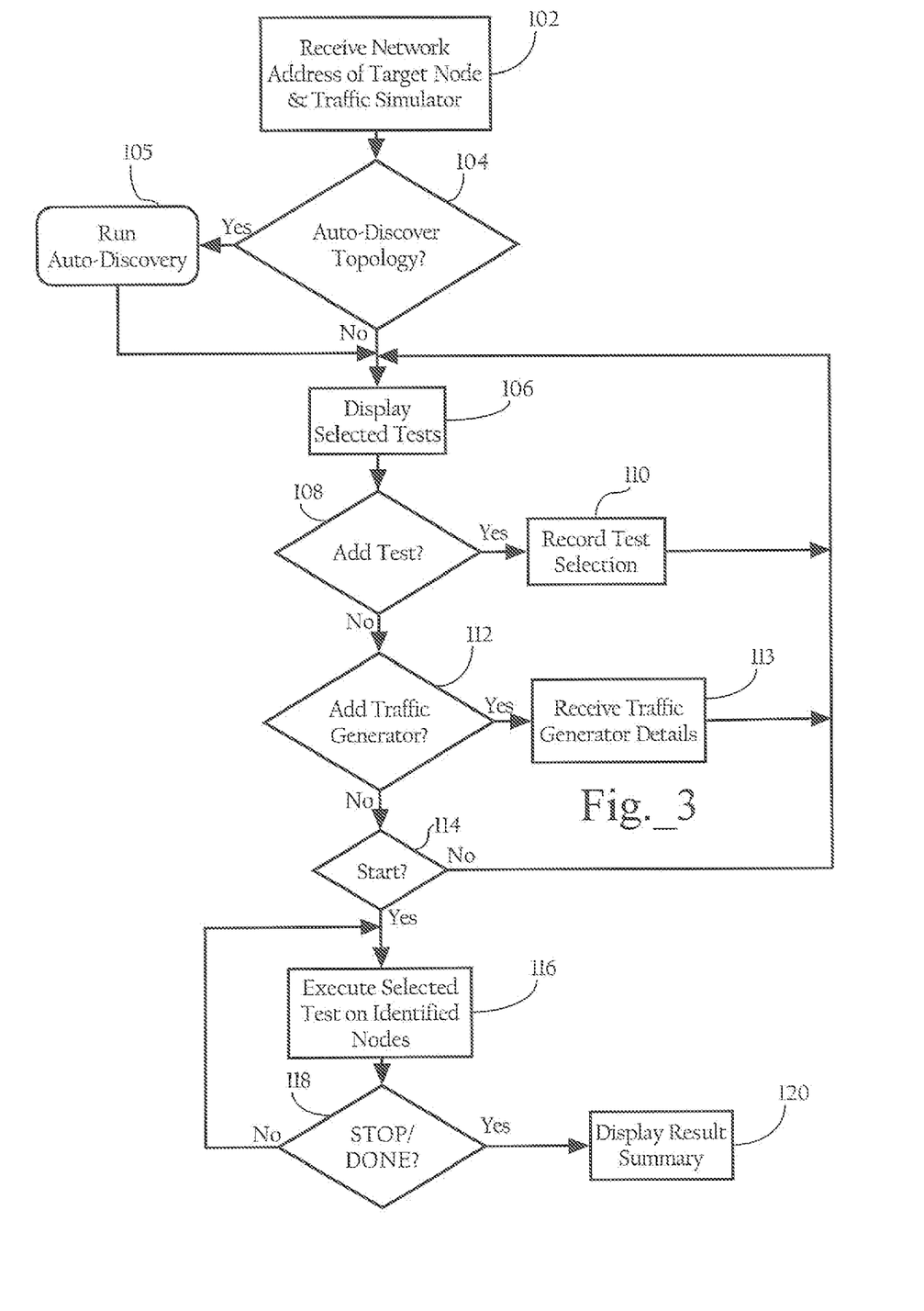
FIG. 3 is a flow chart illustrating an example method according to one implementation of the invention.

FIG. 3 illustrates a process flow, according to a particular implementation of the invention, directed to facilitating execution of one or more tests of optical network element software installed on one or more network elements of an optical network. In one implementation, the management tool presents a graphical user interface that prompts the user for information of an optical network element, and a traffic generator including traffic generating and monitoring functionality. For example, the graphical user interface of management tool may prompt the user for the IP or other network address of a network element of an optical network (Node IP, see element 502 in FIG. 5A), as well as the IP or other network address of one or more traffic generators (102). As discussed above, the traffic generators may include a network traffic simulator or other network testing functionally operative to generate network traffic for testing purposes. In the implementation shown, the graphical user interface also prompts the user for a user name and password for administrative access to the identified network element.

Figure 4:
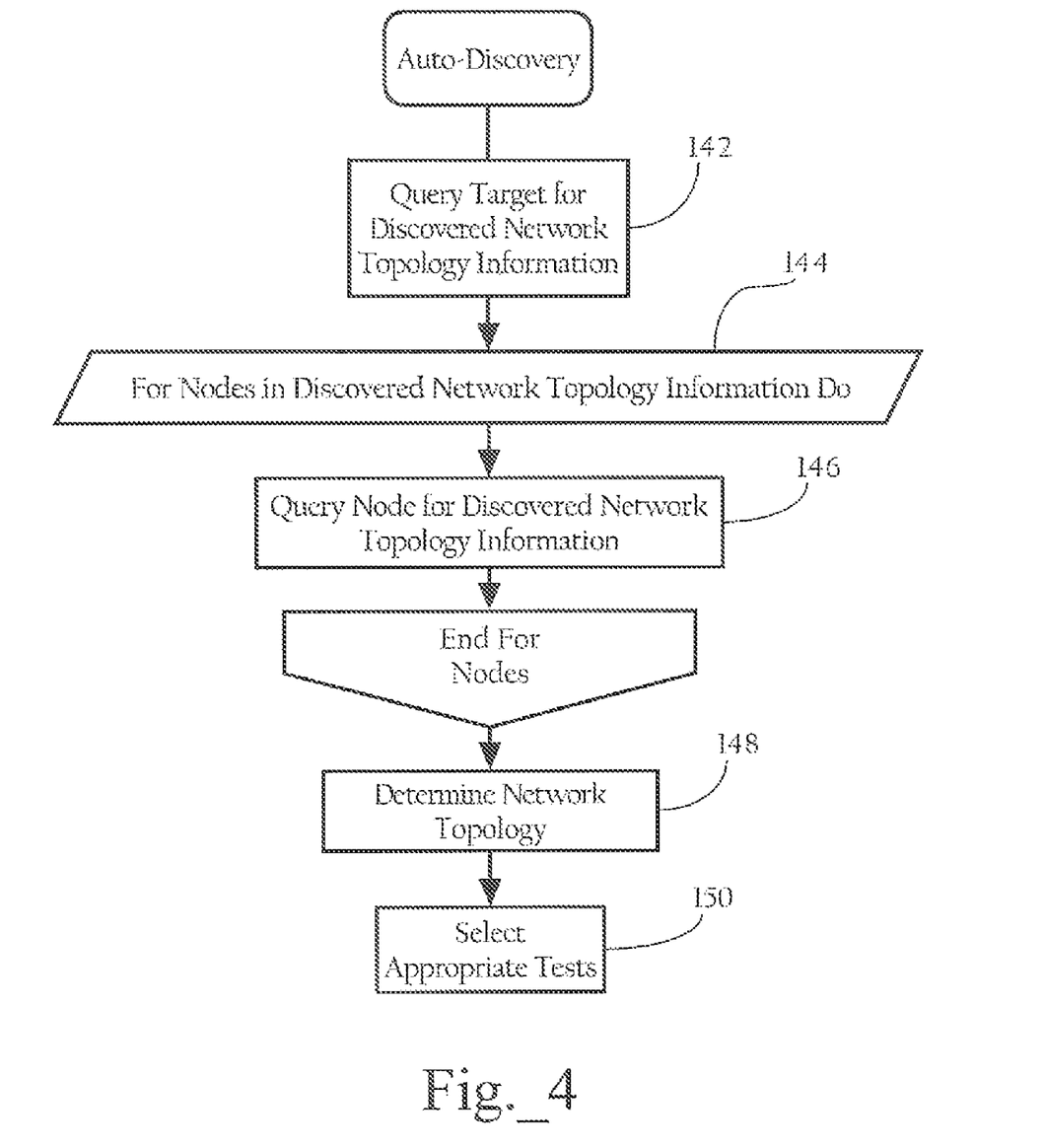
FIG. 4 is a flow chart illustrating another example method according to one implementation of the invention.

As FIG. 3 and FIG. 5A illustrate, the management tool allows the user to elect to have the management tool automatically discover the topology of the network (FIG. 5A, ref. no. 504) and recommend one or more tests based on one or more discovered attributes of the optical network topology (104, 105; see also FIG. 4). In one implementation, all network elements that are operably connected, via a DCC or otherwise, to the identified network element will also be included for execution of the selected tests. As FIG. 4 illustrates, the management tool queries the identified network element for the network topology information that the network element discovered using its internal discovery mechanisms (142). For example, in implementation using the TL1 interface, the management tool may transmit one or both of the following commands to the identified network element:

RTRV-MAP-NETWORK:[<TID>]:<CTAG>; and
RTRV-NE-IPMAP:[<TID>]:[<aid>]:<CTAP>.

The network topology information may include the network or other addresses of one or more additional network elements in the optical network to which the identified network element belongs. The management tool then queries one or more of the identified network elements for discovered network topology information in the same manner (144,146). With this information and the identified relationship between network elements, the management tool determines the network topology of the optical network (148), and selects one or more tests based on the network topology (150).

Figure 5B:
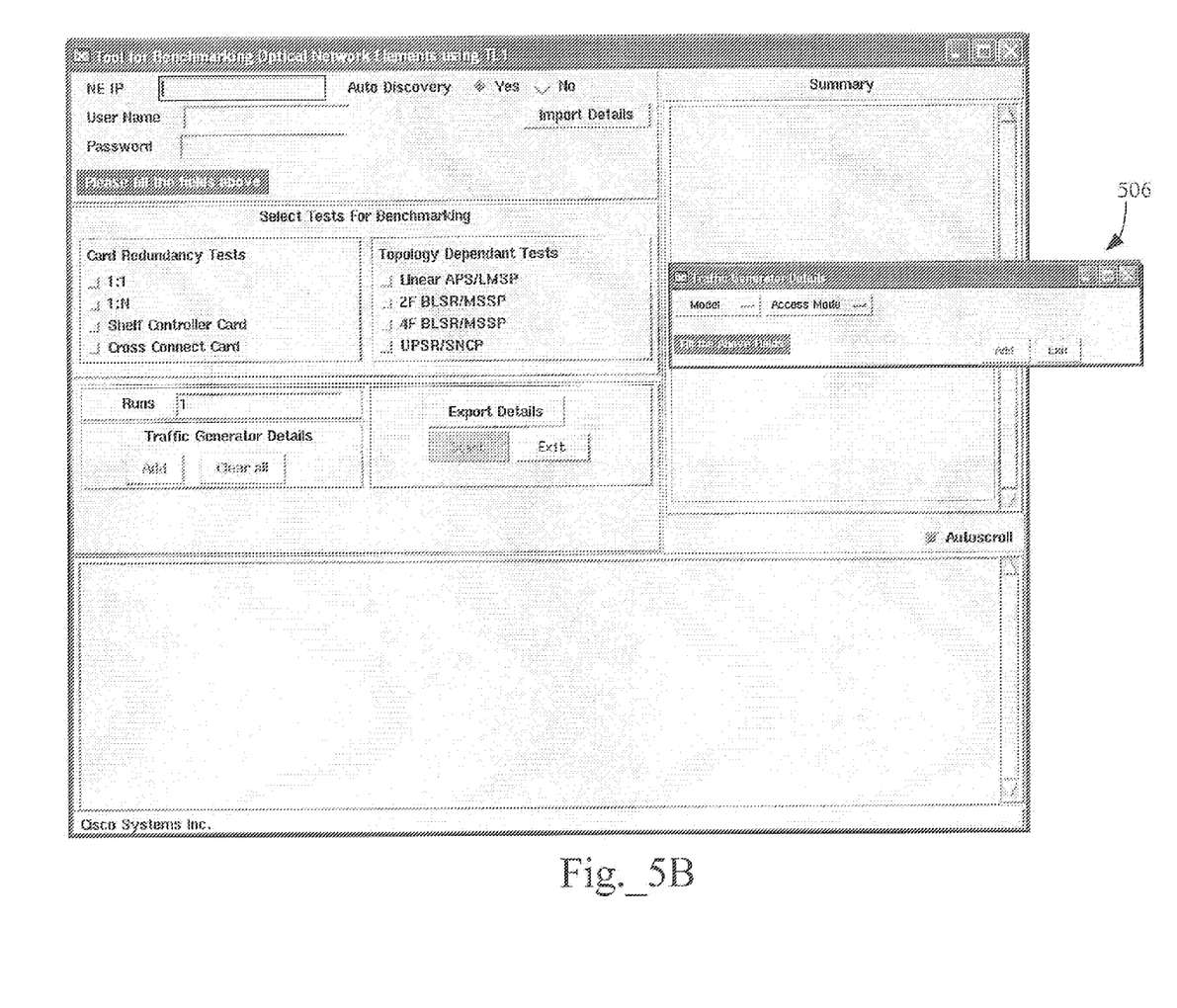
Figure 5H:
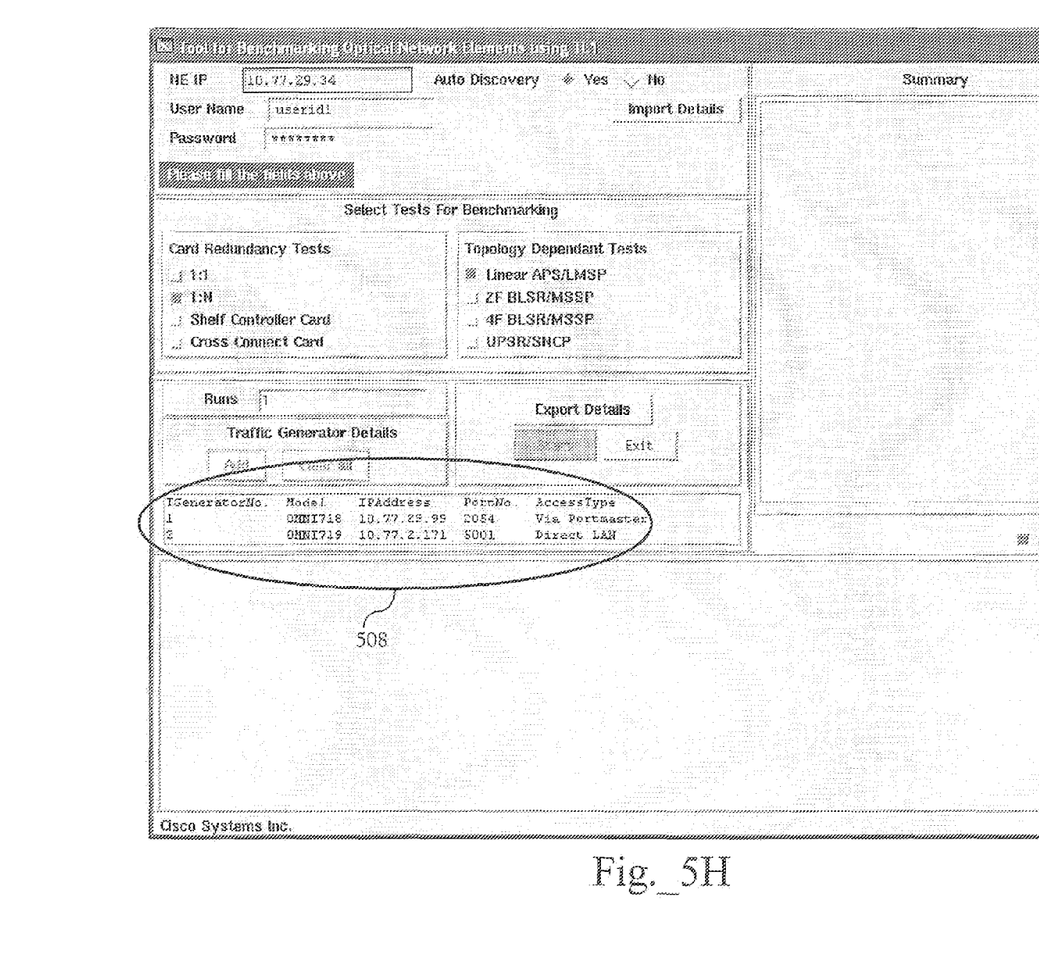

As FIGS. 5B thru 5G show, the graphical user interface displays one or more selected tests (106) (see FIG. 5A, Ref. No. 514), and allows users to add and configure one or more additional tests to be executed by the management tool. In one implementation, the management tool may pre-select one or more tests based on attributes of the discovered network topology. For example, as FIG. 3 illustrates, if a user selects another test (108), the management tool may record the test selection (110) and update the display of selected tests (106). In one implementation, the management tool may indicate the selection of tests by changing an attribute (color, as illustrated in FIG. 5) of the radio button(s) corresponding to the selected tests. Still further, if certain tests selected by the user are not appropriate to the topology or the network elements under test, the management tool may omit execution of them. The tests described above, that are selectable from the tool, can be repeated multiple time by entering required iteration under "Runs" as shown in FIG. 5B, for example.

As FIG. 3 illustrates, the management tool may also allow the user to configure the management tool with the details regarding one or more traffic generators. In the implementation shown, if the user activates the ADD button (112), the management tool may present a traffic generator configuration element 506 that facilitates the selection and configuration of the details for a given traffic generator (113). For example, as FIGS. 5C and 5D illustrate, the management tool may prompt the user to input a model identification of a traffic generator. The management tool, via the GUIs, may also receive one or more additional attributes of the traffic generators. For example, as FIGS. 5E thru 5G illustrate, the use may specify a traffic generator model (see FIG. 5D) and specify whether the traffic generator is operably connected to the optical network via a LAN or through another connection type, such as a portmaster connection (see FIG. 5E). In one implementation, after a user specifies a connection type, the management tool may prompt the user for a network or portmaster address of the traffic generator (see FIGS. 5F and 5G). After specifying attributes of the traffic generator, the user may click on the ADD button to add the details of the traffic generator. On successful addition, certain traffic generator details may appear on the graphical user interface (see FIG. 5H, Ref. No. 508). Using the graphical user interface, the user may add any number of additional traffic generators.

Still further, the management tool also allows the user to export the information entered by the user, and/or discovered by the management tool (e.g., network topology), to a file by using the "export details" button. In addition, the management tool allows the user to import test configuration data using the "import details" button. Some of the test configuration information that can be imported from, exported to, a file include network element details, auto-discovery and network topology details, test-selection details, repetition counts, and traffic generator details.

To initiate execution of the tests, a user may click on the START button 510 (FIG. 3, 114). The management tool then executes the selected tests (116). FIG. 5I shows a graphical user interface presented by the management tool during test execution. When a topology dependent test is selected, an optical network element is tests as per requirements of one or more applicable standards. For example, if BLSR (2F/4F) is selected, the management tool may test one or more optical network elements against requirements from GR1230. Similarly, the management tool may test Linear APS network elements against GR253, and UPSR network elements against GR1400. As discussed above these tests are performed using TL1 commands that are specific to a given topology. For instance, example TL1 commands that may be used for testing BLSR/Linear APS may include:

```
OPR-PROTNSW-
<OCN_TYPE>:[<TID>]:<AID>:<CTAG>::<SC>,
[<SWITCHTYPE>][:<DIRN>];
    RLS-PROTNSW-<OCN_TYPE>:[<TID>]:<AID>:<CTAG>
    [::<DIRECTION>];
    EX-SW-
<OCN_BLSR>:[<TID>]:<AID>:<CTAG>::,[<SWITCHTYPE>],
[<DIRECTION>];
    INIT-SYS:[<TID>]:<AID>:<CTAG>:::<PH>[,<CMDMDE=
    CMDMODE>];
    ED-<OCN_TYPE>:[<TID>]:<AID>:<CTAG>::::[<PST>[,<SST>]];
```

Additionally, example TL1 commands used for testing UPSR may include:

```
OPR-PROTNSW-<PATH>:[<TID>]:<SRC>:<CTAG>::<SC>[:];
RLS-PROTNSW-<PATH>:[<TID>]:<SRC>:<CTAG>[::];
ED-<MOD_PATH>:[<TID>]:<AID>:<CTAG>::::[<PST>[,<SST>]];
INIT-SYS:[<TID>]:<AID>:<CTAG>:::<PH>[,<CMDMDE=
CMDMODE>];
ED-<OCN_TYPE>:[<TID>]:<AID>:<CTAG>::::[<PST>[,<SST>]].
```

In addition to topology dependent tests, the management tool may also support tests that test card level redundancies, such as line cards and common control cards. Many optical network elements have redundant cards that are under 1:1 or 1:N protection group. In 1:1 protect group, there is one to one redundancy. And in 1:N systems, there is one redundancy for every N cards in the Protection group. Example TL1 commands that may be used for testing 1:1 and 1:N protection groups include:

```
INH-SWTOWKG-EQPT:[<TID>]:<AID>:<CTAG>[:::<DIRN>];
INH-SWTOPROTN-EQPT:[<TID>]:<AID>:<CTAG>[:::<DIRN>];
ALW-SWTOWKG-EQPT:[<TID>]:<AID>:<CTAG>[:::<DIRN>];
ALW-SWTOPROTN-EQPT:[<TID>]:<AID>:<CTAG>[:::<DIRN>];
INIT-SYS:[<TID>]:<AID>:<CTAG>:::<PH>[,<CMDMDE=
CMDMODE>];
```

Some optical network elements have cards called as "Common Control cards," which have redundant cards that take over when the working common controller card fails. TL1 commands that may be used to test common control card redundancies include:

```
INIT-SYS:[<TID>]:<AID>:<CTAG>:::<PH>[,<CMDMDE=
CMDMODE>];
INH-SWDX-EQPT:[<TID>]:<AID>:<CTAG>[::];
ALW-SWDX-EQPT:[<TID>]:<AID>:<CTAG>[::];
```

The management tool may also support other tests. For example, the management tool may be operative to run tests to determine whether a given network element accepts required TL1 commands. In similar fashion, tool can be built to have multiple tests as per other SONET and SDH standards.

While performing one or more of the foregoing tests using the management tool, disruption on traffic may be measured using traffic generators, like Agilent's OmniBer. According to GR253, GR1240, GR1400 SONET and their counterpart SDH standards, traffic disruption should not exceed 60 ms (in some cases 100 ms). These measurements can be retrieved from the traffic generators and reported to the user.

Figure 5J:
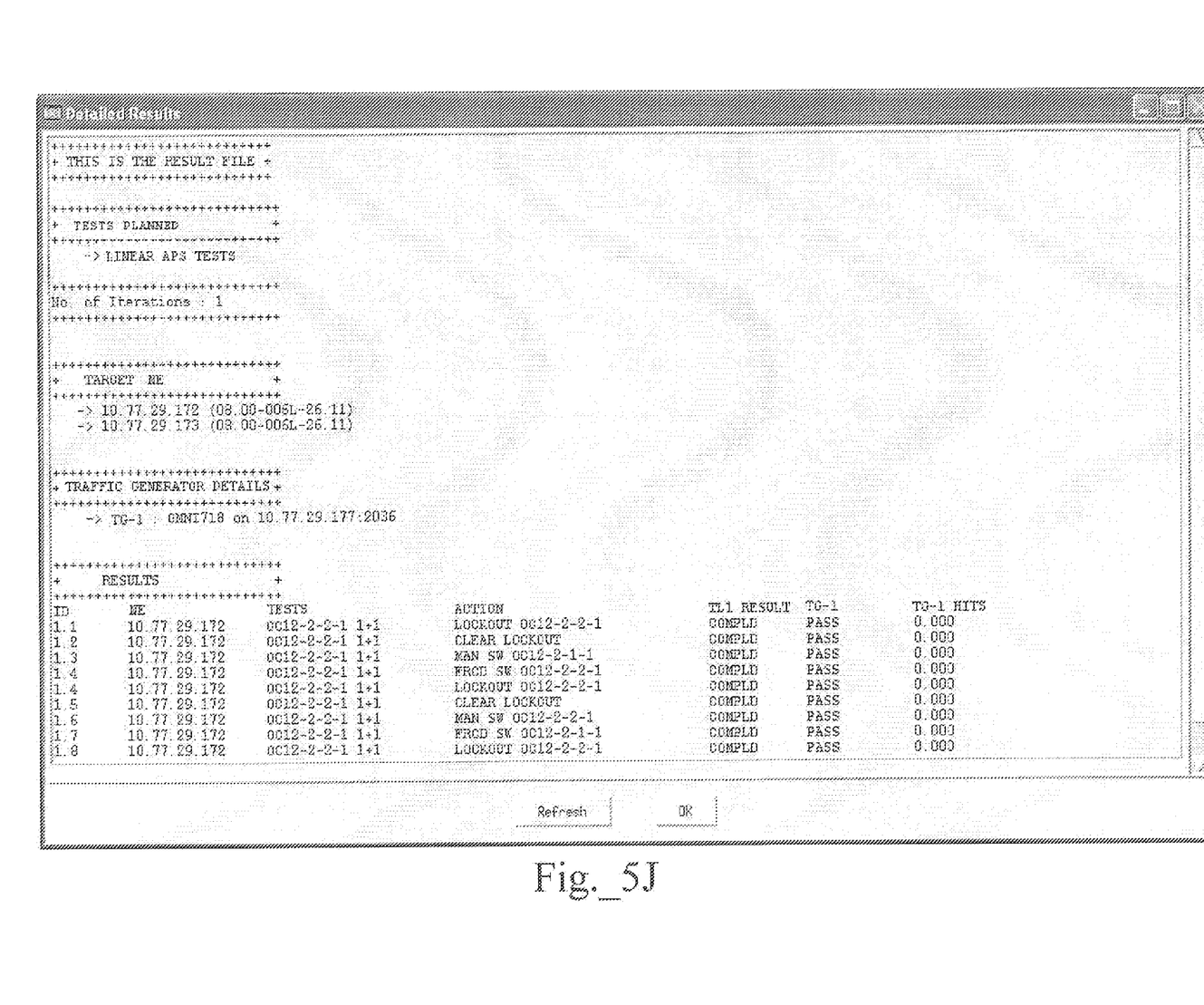

As FIG. 5I illustrates, the management tool displays test status and summary information. As the tests are executed, the management tool receives test results and dumps them into a log file location specified by the user. A lower section of the GUI shows the live actions of the current test script including the test hits as and when they happen. The section labeled "Summary" displays information after all actions in a test type are completed on a network element. In one particular implementation, this information may include the consolidated result (PASSED/FAILED etc) of a test on a given network element. This summary may also be available in a directory folder specified by the user. The detailed results of all actions in each test on each network element are stored, for every run, are stored in a result file. This file can be viewed at any time during the run by pressing the "Detailed Results" button 512. FIG. 5J illustrates the detailed results information displayed for a given test.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention by limited, except as indicated by the appended claims.

What is claimed is:

1. A non-transitory data storage medium encoded with computer executable instructions, the computer executable instructions when executed operable to cause a processor to:
    receive, at a computing system, an identification of a remote optical network element, including network address information of the optical network element;
    query the remote optical network element for optical network topology information, the optical network topology information comprising network address information of one or more additional remote optical network elements;
    identify the network address information for the one or more additional remote optical network elements in the optical network topology information;
    separately query the additional remote optical network elements obtained from the remote optical network element for optical network topology information;
    determine the optical network topology associated with the optical network element based on the network topology information obtained from the remote optical network element and the additional remote optical network elements; and select one or more tests from a plurality of tests based on the network topology information.

2. The data non-transitory storage medium of claim 1, wherein the computer executable instructions when executed are further operable to cause the processor to access one or more traffic generators to gather measurement information obtained during execution of the one or more selected tests.

3. The data non-transitory storage medium of claim 2, wherein the computer executable instructions when executed are further operable to cause the processor to receive an identification of a traffic generator, including access information of the traffic generator.

4. The data non-transitory storage medium of claim 2, wherein the computer executable instructions when executed are further operable to cause the processor to display results of one or more tests.

5. The data non-transitory storage medium of claim 2, wherein the computer executable instructions when executed are further operable to cause the processor to log results of one or more tests.

6. The data non-transitory storage medium of claim 2, wherein the computer executable instructions when executed are further operable to cause the processor to, during execution of one or more tests, access the identified optical network element and one or more optical network elements discovered in the optical network topology information.

7. The data non-transitory storage medium of claim 1, wherein the computer executable instructions when executed are further operable to cause the processor to receive, from a user, indications of additional tests.

8. The data non-transitory storage medium of claim 1, wherein the computer executable instructions when executed are further operable to cause the processor to query optical network elements using a Transaction Language 1 (TL1) interface.

9. A method comprising
receiving, by a computing device, an identification of a remote optical network element, including network address information of the remote optical network element;
querying, by the computing device, the remote optical network element for optical network topology information, the optical network topology information comprising network address information of one or more additional remote optical network elements;
identifying the network address information for the one or more additional remote optical network elements in the optical network topology information;
separately querying, by the computing device, the additional remote optical network elements obtained from the remote optical network element for optical network topology information;
determining, by the computing device, the optical network topology associated with the remote optical network element based on the network topology information obtained from the remote optical network element and the additional remote optical network elements; and
selecting, by the computing device, one or more tests from a plurality of tests based on the network topology information.

10. The method of claim 9 further comprising accessing one or more traffic generators to gather measurement information obtained during execution of the one or more selected tests.

11. The method of claim 10, further comprising receiving an identification of traffic generator, including access information of the traffic generator.

12. The method of claim 10, further comprising displaying results of one or more tests.

13. The method of claim 10, further comprising logging results of one or more tests.

14. The method of claim 10, further comprising accessing during execution of one or more tests, the identified remote optical network element and one or more remote optical network elements discovered in the optical network topology information.

15. The method of claim 9, further comprising receiving, from a user, indications of additional tests.

16. The method of claim 9, wherein querying network elements comprises querying optical network elements using a Transaction Language 1 (TL1) interface.

17. An apparatus comprising
means for receiving an identification of remote optical network element, including network address information of the optical network element;
means for querying the remote optical network element for optical network topology information, the optical network topology information comprising network address information of one or more additional remote optical network elements;
means for identifying the network address information for the one or more additional remote optical network elements in the optical network topology information;
means for separately querying the additional remote optical network elements obtained from the remote optical network element for optical network topology information;
means for determining the optical network topology associated with the remote optical network element based on the network topology information obtained from the remote optical network element and the additional remote optical network elements; and
means for selecting one or more tests from a plurality of tests based on the network topology information.

18. A data non-transitory storage medium encoded with computer executable instructions, the computer executable instructions when executed operable to cause a processor to:
receive an identification of a remote optical network element, including network address information of the remote optical network element;
receive an identification of one or more traffic generators, including access information of the traffic generators;
automatically access the identified optical network element, and one or more traffic generators in connection with execution of one or more tests of the remote optical network element;
query the remote optical network element for optical network topology information;
identify network address information for one or more additional optical network elements in the optical network topology information;
separately query the additional remote optical network elements obtained from the remote optical network element for optical network topology information;
determine the optical network topology associated with the remote optical network element based on the network topology information obtained from the remote optical network element and the additional remote optical network elements; and
select one or more tests from a plurality of tests based on the network topology information.

19. The data non-transitory storage medium of claim 18 wherein the computer executable instructions when executed are further operable to cause the processor to test the identified remote optical network element and one or more remote optical network elements discovered in the optical network topology information.

20. A method comprising
receiving, by a computing device, an identification of a remote optical network element, including network address information of the optical network element;
receiving, by the computing device, an identification of one or more optical network traffic generators, including access information of the optical network traffic generators;
automatically accessing, by the computing device, the identified remote optical network element, and one or more traffic generators in connection with execution of one or more tests of the optical network element, comprising:
 querying the remote optical network element for optical network topology information;
 identifying network address information for one or more additional optical network elements in the optical network topology information;
 separately querying the additional optical network elements obtained from the remote optical network element for optical network topology information;
 determining the optical network topology associated with the optical network element based on the network topology information obtained from the remote optical network element and the additional optical network elements; and
 selecting one or more tests from a plurality of tests based on the network topology information.

21. The method of claim 20, further comprising testing the identified remote optical network element and one or more optical network elements discovered in the optical network topology information.

22. An apparatus, comprising
means for receiving an identification of an optical network element, including network address information of the optical network element;
means for receiving an identification of one or more optical network traffic generators, including access information of the optical network traffic generators;
means for automatically accessing the identified optical network element, and one or more traffic generators in connection with execution of one or more tests of the optical network element;
means for querying the remote optical network element for optical network topology information;
means for identifying network address information for one or more additional optical network elements in the optical network topology information;
means for separately querying the additional optical network elements obtained from the remote optical network element for optical network topology information;
means for determining the optical network topology associated with the optical network element based on the network topology information obtained from the remote optical network element and the additional optical network elements; and
means for selecting one or more tests from a plurality of tests based on the network topology information.

* * * * *